Jan. 12, 1960 K. A. LENNON 2,920,401
MEANS FOR DEMONSTRATING NUCLEAR ENERGY CONCEPTS
Filed Nov. 18, 1957 2 Sheets-Sheet 1

INVENTOR
KENNETH A. LENNON

BY  W. E. Sherwood

ATTORNEY

Jan. 12, 1960 K. A. LENNON 2,920,401
MEANS FOR DEMONSTRATING NUCLEAR ENERGY CONCEPTS
Filed Nov. 18, 1957 2 Sheets-Sheet 2
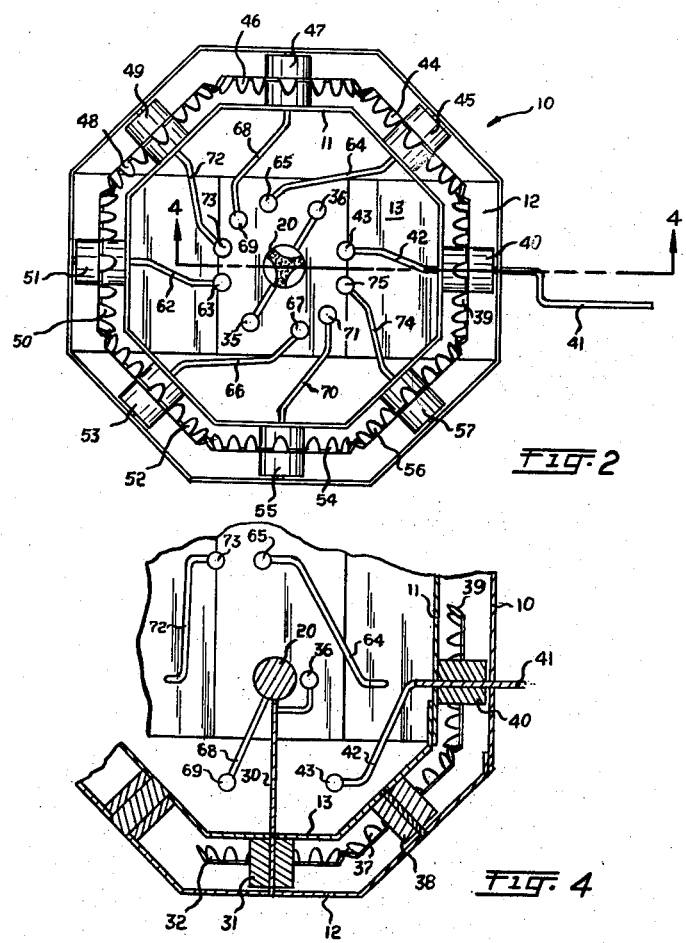
INVENTOR
KENNETH A. LENNON
BY *W. E. Sherwood*
ATTORNEY

United States Patent Office 2,920,401
Patented Jan. 12, 1960

2,920,401

MEANS FOR DEMONSTRATING NUCLEAR ENERGY CONCEPTS

Kenneth A. Lennon, Lexington, Ky.

Application November 18, 1957, Serial No. 697,100

4 Claims. (Cl. 35—18)

This invention relates to an improved apparatus for visually demonstrating nuclear energy concepts, and, more particularly, to an apparatus for depicting the electron shell structure of an atom in an improved manner.

The invention is especially suited for teaching of present day theory of atomic structure, such as encountered by students in elementary courses in physics and chemistry. It also has utility in providing a simple, readily understood, and relatively accurate concept of such theory for persons casually interested in such matters, as, for example, visitors briefly viewing exhibits in museums and the like. While many forms of apparatus for teaching the general theory of atomic structure have been proposed heretofore, all such forms of which I am aware, have possessed one or more disadvantages, and especially in the aspect of demonstrating the electron shell arrangement and the concept of the "emptiness" of the atom. It is this and similar disadvantages which it is a purpose of my invention to overcome.

An object of my invention is to provide an improved apparatus for demonstrating the relation of the nucleus and orbital electrons in an atom as conceived by present day theory.

Another object is to provide an improved apparatus capable of forming a lasting impression in the mind of the viewer by causing three dimensional movement of light emitting electrons in a shadow box structure.

A further object is to provide a simple and relatively inexpensive dynamic apparatus suitable for demonstrating nuclear energy concepts and which may be conveniently portable; which may be handled by the student receiving instruction; and which requires no external electrical or mechanical connections.

In carrying out my invention I provide a simple enclosure or housing having a viewing window and interiorly coated with a light absorbing or black body material. A framework disposed within the housing serves to mount a plurality of inter-engaging gears adapted to be moved by a selectively rotatable shaft. Mounted upon and driven by these gears are a plurality of arms having a configuration permitting simultaneous rotation of the same without interference with each other. These arms in turn carry ball-like members at their extremities and the arms likewise are coated with a light-absorbing material. The ball-like members, however, simulate the nucleus and orbital electrons of an atom and are coated with or consist of a light emitting material, such as a phosphorescent material. Thus, the position of the ball-like members at any time may be detected visually through the window in the housing and upon actuating the shaft, a striking impression of the kinetic energy and general electron shell structure within a typical atom is gained.

The novel features, which I believe to be characteristic of my invention, are set forth with particularity in the appended claims. My invention itself, however, may be best understood by reference to the following description taken in conjunction with the accompanying drawings in which:

Fig. 2 is a top view of the apparatus of Fig. 1 with the top and bottom of the housing removed and with the electrons at a position in their orbits corresponding to another position of the rotatable shaft;

Fig. 4 is a detail taken on line 4—4 of Fig. 2 and showing a driving connection for the simulated nucleus.

Figure 1:
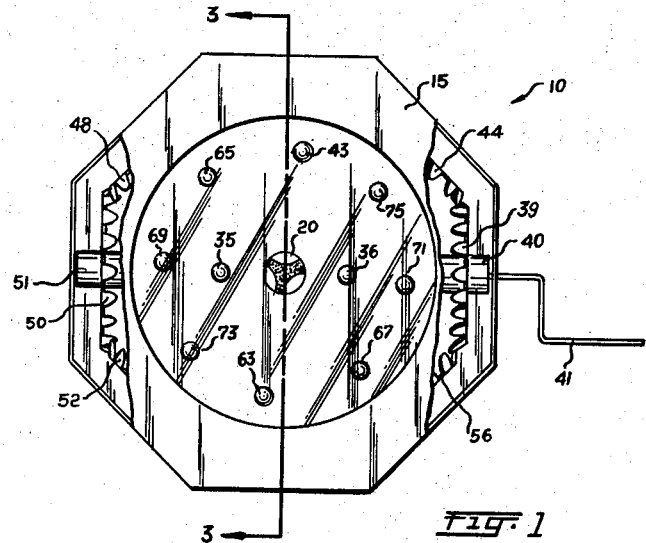
Fig. 1 is a top view of one form of apparatus illustrative of the element Neon, with portions of the housing broken away and with the electrons at a position in their orbits corresponding to one position of the rotatable shaft.
Figure 3:
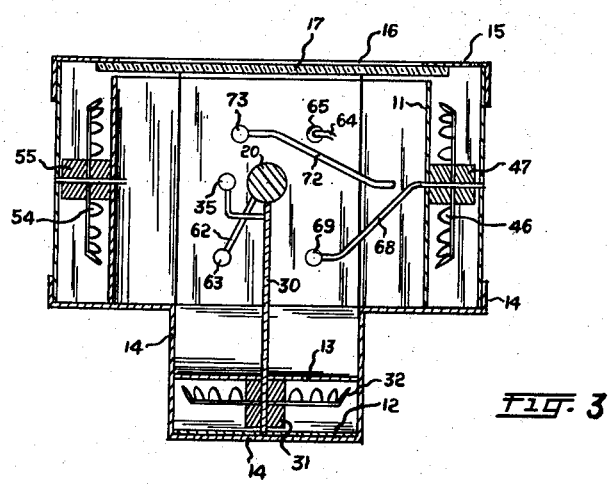
Fig. 3 is a sectional view taken on line 3—3 of Fig. 1, but with the electrons at a position in their orbits corresponding to their position in Fig. 2.
Figure 5:
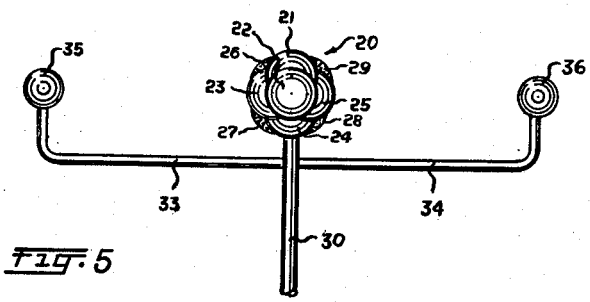
Fig. 5 is a detail view to a larger scale and showing a side elevation of the simulated nucleus and electrons of the first shell of the atom.

Referring now to Figs. 1 and 2, I provide a housing 10 containing a number of confronting, uniformly spaced, side wall portions, here shown as eight in number, and interiorly of which a similarly shaped framework 11 is rigidly mounted concentrically with the housing. A concave shaped truss member 12 having three distinct planar areas, extends across the lower portion of the housing and is suitably affixed to diametrically opposed side wall portions of the housing, thus to provide bracing for the assembly and a structure upon which a similarly shaped floor portion 13 of the framework may be mounted. A bottom enclosure 14 is suitably affixed to the housing in enveloping relation to the truss member 12 and floor portion 13 and serves to prevent light from entering the structure at the bottom or sides thereof.

As a significant feature, the inner surfaces of the framework 11, floor portion 13 and bottom enclosure 14 are coated with or comprise a light absorbing or black body material. On its top portion, the housing includes a suitable cover 15 having a central aperture 16 therein and with a transparent window 17 covering that aperture. Although the top portion is here shown as flat in shape for reasons of economy, my invention comprehends the use of a curved dome-like top when such is desired. As will thus be apparent, the user of the apparatus may view the interior of the darkened housing by looking through the window into the confined inner space therewithin, which housing accordingly serves as a shadow box.

Referring now to Figs. 2 to 5, there is provided adjacent the center of the interior of the housing a generally globular member 20 simulating the nucleus of the atom under demonstration. Preferably, this member is substantially larger than the spheres representing the electrons later to be described, and comprises a number of convex shaped projections simulating nucleons, certain of which are seen at 21, 22, 23, 24 and 25 in Fig. 5. The number of such nucleon representations preferably depends upon the particular atom represented and, since in the apparatus chosen for illustration, the element Neon is represented, a total of about nineteen to twenty-three such nucleons preferably are contained in nucleus 20, thus indicating the number of protons and neutrons in the isotopes of that element. The exterior surface of each of these nucleons is coated with a conventional phosphorescent material which, after exposure to a light source, will later emit light for a substantial period of time. Between adjacent nucleons on the nucleus 20, a coating of black body material as seen at 26, 27, 28 and 29 is provided, thus to distinguish the nucleons from each other, and to provide a representation of a meson field with short range forces holding the nucleons together. If desired, a distinctive appearance may be given to the protons to distinguish them from the neutrons.

The nucleus 20 is rotatably supported by a shaft 30 which is journalled in truss member 12 and floor portion 13. Affixed to shaft 30 and disposed between that truss member and floor portion is a driving hub 31 to which is attached a drive gear 32 of any suitable construction and gear ratio. Extending from shaft 30 is a pair of arms 33 and 34 carrying at their upper ends a pair of relatively small spheres 35 and 36, the centers of which preferably, although not necessarily, lie in the plane of the center of nucleus 20. These spheres simulate the two electrons of the innermost shell of the atom and, like the projections representing the nucleons, are coated with a phosphorescent material. Shaft 30 and arms 33, 34, however, are coated with a black body material.

As seen in Fig. 4, gear 32 is driven by idler gear 37 attached to hub 38 which is journalled for rotation between the truss member 12 and the floor portion 13. In turn, the idler gear 37 is driven by gear 39 which is attached to hub 40 journalled for rotation between a side wall of the housing 10 and a corresponding side wall of the framework 11. Extending through hub 40 and attached thereto, is an actuating member 41 which may be operated manually or by any suitable external drive means (not shown). As one feature of my invention, the entire apparatus may be made in compact, lightweight form adapted for manual handling by the student or instructor and requiring no separate electrical or mechanical connections and accordingly, the actuating means 41 is here shown as a simple crank member.

Extending from hub 40 is an elongated crank arm 42 bent toward the center axis of the housing at its distal end and carrying at that end a small sphere 43 simulating an electron of the next innermost shell of the atom being represented. As hub 40 and gear 39 are rotated, the sphere 43 describes an orbit of fixed radius which, when viewed through window 17, defines a path around the surface of an imaginary sphere representing the second or next innermost electron shell of the atom. To prevent interference with the nucleus 20 and shaft 30, the length of crank arm 42 is such as to cause the sphere 43 to pass close by, but not to strike that nucleus and shaft and thus, the plane of rotation of sphere 43 is slightly to one side of a parallel plane through the center of that nucleus, as are the planes of rotation of the other electrons of the same shell.

Whereas the speed of rotation of the electrons of the innermost shell may be of any desired value, the speed of rotation of all of the electrons of the next innermost shell preferably is the same and this is accomplished by providing identical gears and hubs 44, 45; 46, 47; 48, 49; 50, 51; 52, 53; 54, 55; and 56, 57. Due to the even number of gears so employed, and which mesh with adjacent gears, rotation of the drive gear 39 serves to drive both of its adjacent gears 44 and 56 regardless of the direction in which actuating means 41 is driven and thus, backlash in the several gears presents no problem in regard to the intersecting orbits of the several spheres simulating the electrons.

Extending from hub 45 in an elongated crank arm 64, preferably of the same size as crank arm 42, projecting into the interior space within the framework, and carrying a sphere 65 at its distal end representing another electron of the second shell of the atom. The mounting of the crank arms 42 and 64 within the space is such that as electron 43 is moved upwardly toward window 17, the adjacent electron 65 is moving downwardly therefrom. Thus, at any given moment, and as related to the nucleus, one of these electrons is travelling clockwise and the other is travelling counter-clockwise. In similar manner, adjacent electrons mounted inwardly from the framework, rotate in opposite directions in the form of structure shown herein, although this is not essential in order to achieve the desired visual effect in all forms of structure. Thus, the viewer sees these electrons in motion at spaced points on the surface of the imaginary spherical electron shell and receives a visual impression of a cloud or envelope of moving electrons around and spaced from the rotating nucleus and the two innermost electrons cooperating with that nucleus.

For example, the pair of crank arms 64 and 66, carrying spheres 65 and 67, are attached to hubs 45 and 53, respectively. The orbits of these simulated electrons, in the form of apparatus shown, are in planes displaced about 45° from the planes of the pair of electrons 43 and 63. In like manner, a pair of crank arms 68 and 70 carrying spheres 69 and 71 are attached to hubs 47 and 55, respectively; and a pair of crank arms 72 and 74 carrying spheres 73 and 75 are attached to hubs 49 and 57, respectively. Thus, the orbit of each of the electrons is spaced in a plane about 45° from the plane of the orbit of its adjacent electron and these intersecting planes serve to give a three-dimensional effect to the electron shell as viewed through the window.

In each case, the spheres representing electrons are coated with a phosphorescent material and the crank arms supporting those spheres are coated with a black body material. The relative spacing between the electrons of the innermost shell and the nucleus and the electrons of the next innermost shell and that nucleus may be of any desired value depending upon the desired overall size of the apparatus. I have found that an approximately equal spacing between the shells and between the innermost shell and the nucleus, as seen in Fig. 1, serves to give a compact easily handleable apparatus, and, at the same time, a definite appreciation of the emptiness of the atom.

If desired, the crank arms supporting the electrons of the next innermost orbit may be detachably secured to their respective hubs for ready removal therefrom, or the desired number of electrons on those crank arms and nucleons of the nucleus, may be covered with a black body material during instructional use of my apparatus, thus to simulate atoms of helium, lithium, beryllium, boron, carbon, nitrogen, oxygen and fluorine by means of the same apparatus. Likewise, to simulate the element hydrogen, one of the electrons of the innermost shell may be similarly removed or covered. Moreover, it is within the purview of the invention to employ the described apparatus in conjunction with means for simulating one or more additional electron shells of atoms and which may be incorporated into a housing larger than that herein shown.

The use of the described apparatus for instructional purposes and for demonstrating nuclear concepts will be apparent to those skilled in the art. By directing a light source through window 17 into the shadow box provided by the housing, the nucleus and electrons will be rendered light-emissive. Thereafter, by rotating the actuating means 41 at a convenient speed, certain basic kinetics of the atom under consideration will be readily apparent as the several electrons rotate in their orbits and are viewed through window 17. Furthermore, if desired, each of the spheres representing electrons, as well as the nucleus sphere, may be rotatably mounted on their supporting arms for purposes of demonstrating a concept of electron and nucleus component spin.

While in accordance with the patent statutes, I have shown what at present is considered to be the preferred embodiment of my invention, it will be obvious to those skilled in the art that various changes and modifications may be made therein without departing from my invention, and I, therefore, aim, in the appended claims, to cover all such charges and modifications as fall within the true spirit and scope of the invention.

What I claim as new and desire to secure by Letters Patent of the United States is:

1. For use in demonstrating nuclear energy concepts, a framework having an interior space therein, means mounted upon said framework along a first axis and projecting into said space and simulating the nucleus and two orbital electrons of the innermost shell of an atom, means rotatably mounted on said framework along a second axis and simulating an electron movable in an orbit corresponding to a portion of the next innermost shell of said atom, said latter electron being mounted for movement at a uniform distance from said nucleus at all times, and means mounted upon said framework for moving said latter electron in said orbit.

2. For use in demonstrating nuclear energy concepts, a framework having an interior space therein, means mounted upon said framework along a first axis and projecting into said space and simulating the nucleus and two orbital electrons of the innermost shell of an atom, means rotatably mounted on said framework along axes different from said first axis and simulating a plurality of electrons movable in orbits corresponding to portions of the next innermost shell of said atom, said latter electrons being mounted for movement in intersecting planes and at a uniform distance from said nucleus during their movement in said planes thereby to provide a three-dimensional representation of said next innermost shell, and means mounted upon said framework for moving said latter electrons simultaneously in their orbits in said intersecting planes.

3. Apparatus as defined in claim 1 including means for rotating said nucleus and orbital electrons of said innermost shell simultaneously with movement of said latter electron.

4. For use in demonstrating nuclear energy concepts, a framework comprising a plurality of inwardly confronting sides, a concave truss member joining two of said sides and providing a three-dimensional open space within said framework, means rotatably mounted upon said truss member and simulating the nucleus and two orbital electrons of the innermost shell of an atom, said nucleus being disposed adjacent the center of said open space, rotatable means projecting into said open space from a plurality of said confronting sides of said framework and simulating a plurality of electrons in the next innermost shell of said atom, each of said latter simulated electrons being mounted for movement in orbits corresponding to portions of said next innermost shell and lying in planes intersecting with the planes of adjacent electrons and movable through said open space at uniform distances from said simulated nucleus, and means mounted upon said truss member and upon said sides of said framework for rotating said nucleus and said electrons of both the innermost and next innermost shells of said atom simultaneously.

References Cited in the file of this patent

UNITED STATES PATENTS

| | | |
|---|---|---|
| 1,770,820 | Tomasevich | July 15, 1930 |
| 1,880,026 | Singerman | Sept. 27, 1932 |
| 2,516,418 | Ramsay | July 25, 1950 |
| 2,601,729 | Underwood | July 1, 1952 |
| 2,651,115 | Davies | Sept. 8, 1953 |

FOREIGN PATENTS

| | | |
|---|---|---|
| 55,975 | France | June 4, 1952 |

(Addition to No. 991,133.)